(12) United States Patent
Saccone

(10) Patent No.: US 9,816,465 B2
(45) Date of Patent: *Nov. 14, 2017

(54) MIXING BLOCK

(71) Applicant: Hydrogen Energy Systems, LLC, Akron, OH (US)

(72) Inventor: Rick Saccone, Akron, OH (US)

(73) Assignee: Hydrogen Energy Systems, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,804

(22) Filed: Jun. 6, 2016

(65) Prior Publication Data

US 2016/0281643 A1   Sep. 29, 2016

Related U.S. Application Data

(63) Continuation of application No. 13/236,263, filed on Sep. 19, 2011, now Pat. No. 9,359,943, and a continuation of application No. 14/959,829, filed on Dec. 4, 2015, which is a continuation of application No. 13/922,221, filed on Jun. 19, 2013, now abandoned.

(60) Provisional application No. 61/470,902, filed on Apr. 1, 2011, provisional application No. 61/661,653, filed on Jun. 19, 2012.

(51) Int. Cl.
| | | |
|---|---|---|
| F01P 7/14 | (2006.01) |
| F02M 21/04 | (2006.01) |
| F02B 43/10 | (2006.01) |
| F02D 19/06 | (2006.01) |
| F02B 43/00 | (2006.01) |
| F02D 19/02 | (2006.01) |
| F02M 21/02 | (2006.01) |
| F01P 7/16 | (2006.01) |

(52) U.S. Cl.
CPC ............ *F02M 21/04* (2013.01); *F02B 43/10* (2013.01); *F02D 19/023* (2013.01); *F02D 19/0644* (2013.01); *F02M 21/0206* (2013.01); *F02M 21/0239* (2013.01); *F01P 7/16* (2013.01); *F01P 2007/146* (2013.01); *F01P 2060/02* (2013.01); *F02B 43/00* (2013.01); *F02D 19/02* (2013.01); *F02M 21/02* (2013.01); *F02M 21/0248* (2013.01); *Y02T 10/32* (2013.01); *Y02T 10/36* (2013.01)

(58) Field of Classification Search
CPC   F01P 7/16; F01P 7/65; F01P 2007/146; F01P 2060/02
USPC ......................................................... 123/41.1
See application file for complete search history.

*Primary Examiner* — Jacob Amick
*Assistant Examiner* — Charles Brauch
(74) *Attorney, Agent, or Firm* — FisherBroyles, LLP

(57) ABSTRACT

A mixing block to supply a throttle-able hydrogen and air mixture to an internal combustion engine includes a bore through the mixing block between an air intake side and an engine intake side. A slider chamber is disposed orthogonal to and intersecting the bore, where the slider chamber houses a movable slider biased to at least partially block the bore but throttle-able to overcome the bias and reduce blockage of the bore. A jet chamber is disposed parallel to and intersecting the slider chamber and extending away from the slider chamber a distance sufficient to accommodate a shaped needle, where the needle is connected to the slider on one side such that the needle moves within the jet chamber as the slider moves in the slider chamber.

11 Claims, 5 Drawing Sheets

MIXING BLOCK

This application is a continuation of and claims priority to and the benefit of U.S. patent application Ser. No. 13/236,263 filed on Sep. 19, 2011 and U.S. Provisional Application No. 61/470,902 filed Apr. 1, 2011, and is a continuation of and claims priority to and the benefit of U.S. patent application Ser. No. 14/959,829 filed on Dec. 4, 2015, which is a continuation of U.S. patent application Ser. No. 13/922,221 filed on Jun. 19, 2013, which claims the benefit of U.S. Provisional Application No. 61/661,653 filed Jun. 19, 2012.

There is a growing need in the internal combustion arts to improve engine longevity, reduce emissions and lessen dependence on fuels or raw materials from less stable trading partners. Modifications to currently available internal combustion engines are detailed below to accomplish some or all of these.

The accompanying drawings, which are incorporated in and constitute a part of the specification, illustrate various example systems, methods, and so on that illustrates various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements in the drawings may not be to scale, emphasis instead being placed upon clearly illustrating the principles of the present disclosure.

DETAILED DESCRIPTION

Figure 1:
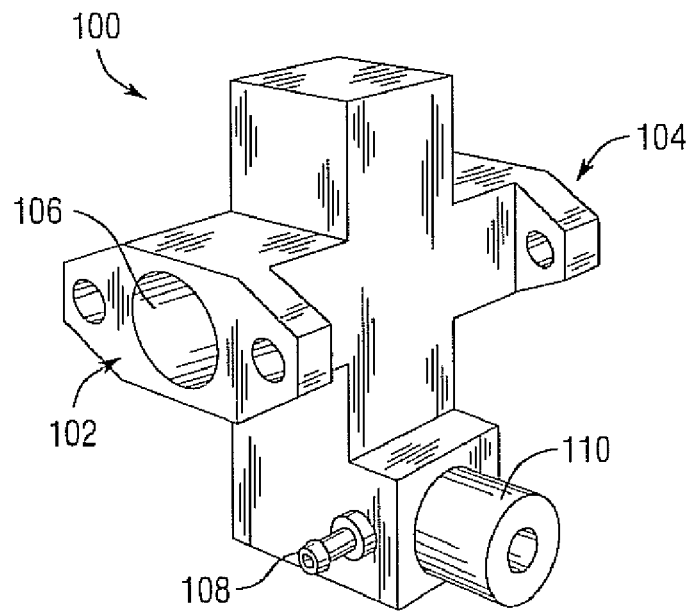
FIG. 1 is a perspective view of an exemplary mixing block.

With reference to FIG. 1, an exemplary hydrogen and air mixing block 100 is shown. The mixing block 100 may be machined, cast, injection molded or otherwise formed to comprise an air intake side 102 which may be configured for attachment with an air-filter (not shown) to reduce particle or other contaminant entry into the mixing block. The mixing block 100 may also comprise an engine intake side 104 configured for connection with a fuel/air intake of an internal combustion engine (not shown). A bore 106 is formed through the mixing block 100 between the air intake side 102 and the engine intake side 104. Mixing block 100 additionally includes a gas inlet 108 for connection with a source of pressurized hydrogen gas. As will be more completely discussed below, the mixing block 100 may also include a hydrogen gas interrupter, in other words, a fuel shut off shown in FIG. 1 as an electrically controlled solenoid 110.

Figure 2:
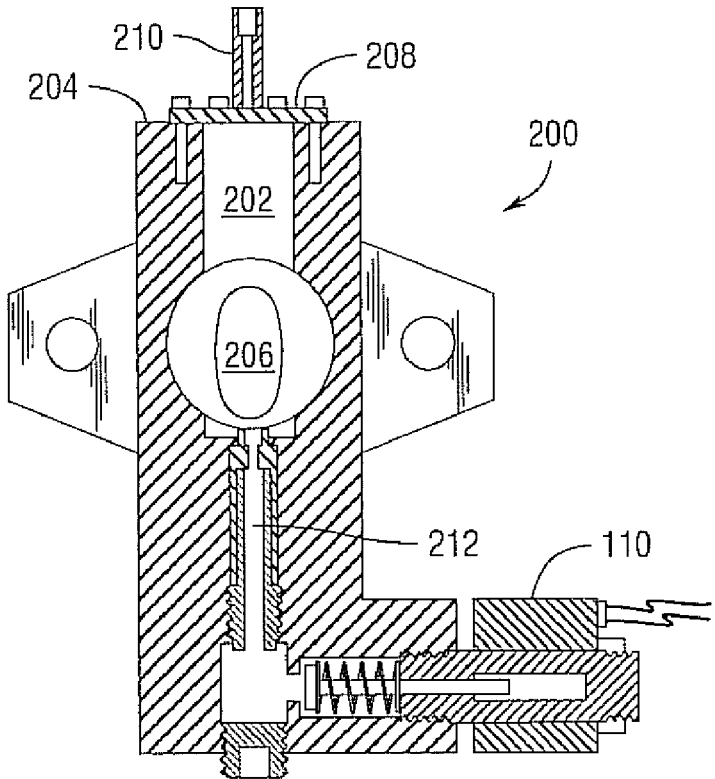
FIG. 2 is a cross-sectional view of an exemplary mixing block.

With reference to FIG. 2, a cross-sectional view of an exemplary mixing block 200 is shown. Formed within mixing block 200 is a slider chamber 202 shaped to accommodate a slider assembly (not shown) more completely described below. Slider chamber 202 extends from a first, top side 204 of the mixing block and continues partially through the mixing block body to intersect bore 206 that extends between the air intake side and the engine intake side. Connected to the top side 204 of the mixing block is a slider cap 208. Slider cap 208 retains interior elements more completely discussed below and permits passage of a throttle cable through stay 210 threaded into slider cap 208. Also formed within mixing block 200 is a jet chamber 212 shaped to accommodate a gas flow-control device (not shown) such as a shaped needle more completely described below. Jet chamber 212 connects the slider chamber 202 and a source of pressurized hydrogen gas and permits fluid communication therebetween.

Figure 3:
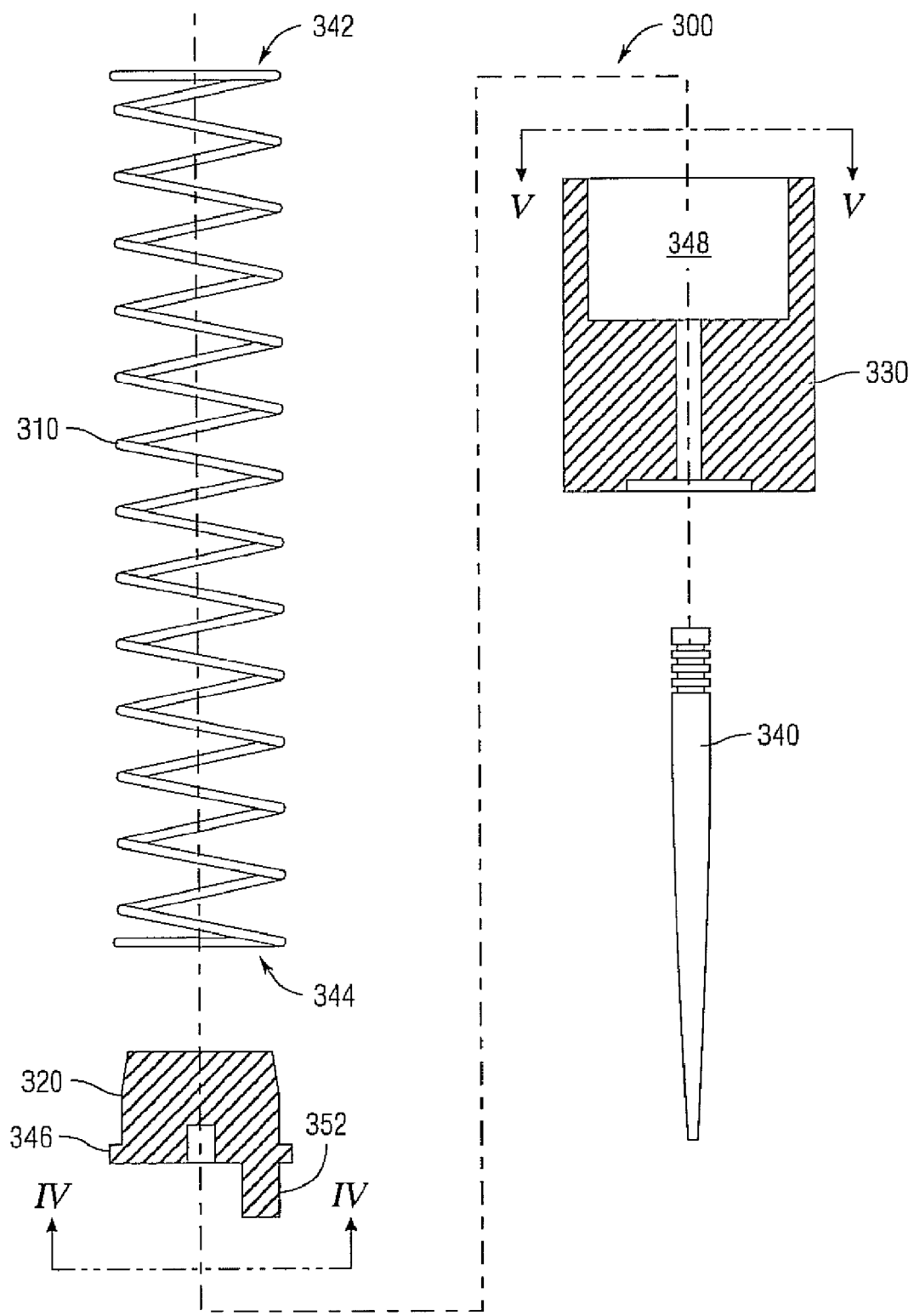
FIG. 3 is an exploded view of an embodiment of a slider assembly.

With reference now to FIG. 3, a slider assembly 300 is shown. In the illustrated embodiment, the slider assembly includes a biasing mechanism 310 such as a spring, a retainer 320, a slider 330, and a flow controller 340 such as a shaped needle. When installed in the mixing block, a first side 342 of biasing mechanism 310 is mechanically retained by a slider cap connected to the mixing block. Retainer 320 is disposed on a second side 344 of the biasing mechanism opposite the first side 342. In the illustrated embodiment, retainer 320 includes a circumferential lip 346 to engage biasing mechanism at the second side 344. Retainer 320 is further closely fitted into a retaining cavity 348 formed in slider 330. In one embodiment, retainer 320 includes a lug 352 extending away from retainer and shaped for close fitting into a complementary receptacle (not shown) in the slider 330. Flow controller 340 passes through the slider 330 and is connected to the retainer 320 at a flow controller connection 354. Retainer 320 and flow controller 340 may be integrally made or connected by a clip, threads, and the like. The bias achieved causes the slider 330 to at least partially interrupt the bore between the air intake side and the engine intake side of the bore, reducing or preventing air from passing to the engine while also seating flow controller 340 in the jet chamber, reducing or preventing hydrogen from passing to the engine. In other embodiments, the slider 330 and complementary shaped slider chamber 202 and/or the bore 106 may be cylindrical as shown, rectangular, conical or other shapes and combinations of shapes capable of providing the desired function.

Figure 4:
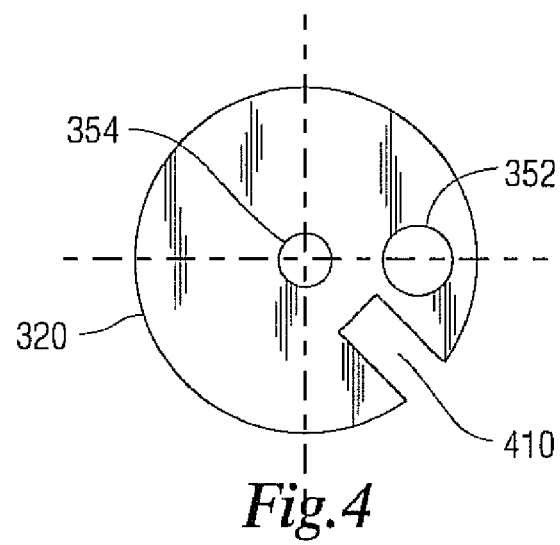
FIG. 4 is bottom plan view taken along lines IV-IV of FIG. 3.

As best appreciated by reference to FIG. 4, retainer 320 includes an interruption 410 extending partially radially inward and throughout the retainer body to permit a throttle cable to pass through the retainer. Retainer 320 also includes: lug 352 to engage the slider and retain the throttle cable; and a flow controller connection 354.

Figure 5:
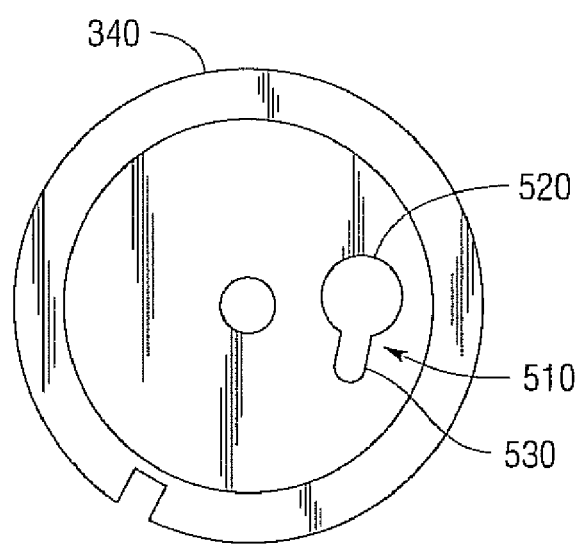
FIG. 5 is top plan view taken along lines V-V of FIG. 3.

As best appreciated by reference to FIG. 5, slider 330 includes a throttle cable retainer 510. In the illustrated embodiment, throttle cable retainer 510 comprises a keyhole shape to accept a cable-keeper end of a throttle cable. During installation, the cable end is inserted through the larger diameter side 520 and slid to the smaller side 530 to retain the cable end. Once positioned, the lug 352 on retainer 320 is fit into the larger diameter side 520 holding the cable in the slider.

Figure 6:
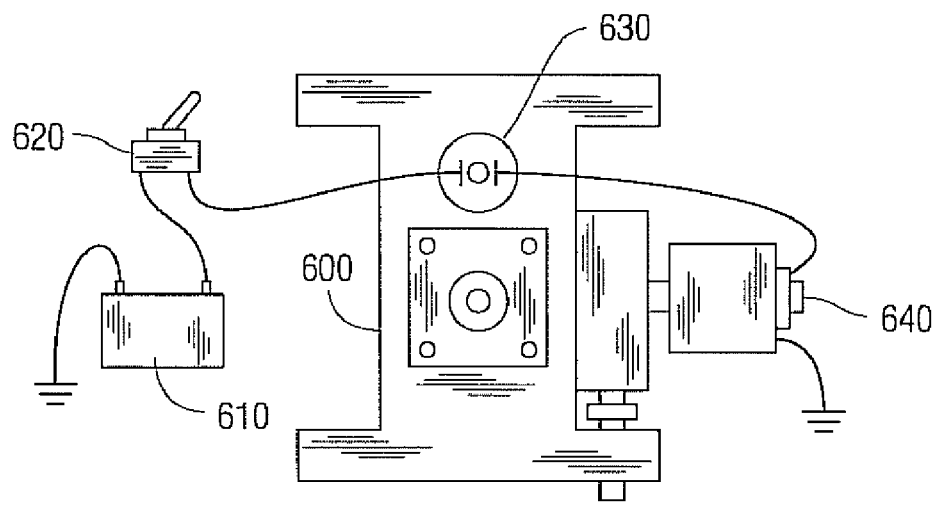
FIG. 6 is top plan view of an exemplary mixing block.

Referring now to FIG. 6, mixing block 600 may additionally include a fuel supply interlock system. In one embodiment, the fuel supply interlock system includes a source of electrical power 610 connected to a user switch 620 that may be user operated to place the system in a safe or in other words no electrical connectivity. User switch 620 can take the form of a toggle-type switch, a key, push button or other electrical circuit interrupters. The user switch 620 is connected in electrical series with a vacuum switch 630. The vacuum switch 630 is disposed on the engine intake side of the mixing block and senses vacuum created when the internal combustion engine turns. When vacuum is sensed, the vacuum switch 630 closes establishing electrical connectivity through the switch. The vacuum switch 630 is connected in electrical series with solenoid 640 and in turn to ground completing the circuit. When energized, solenoid 640 operates to permit pressurized hydrogen gas into the mixing block 600.

Figure 7:
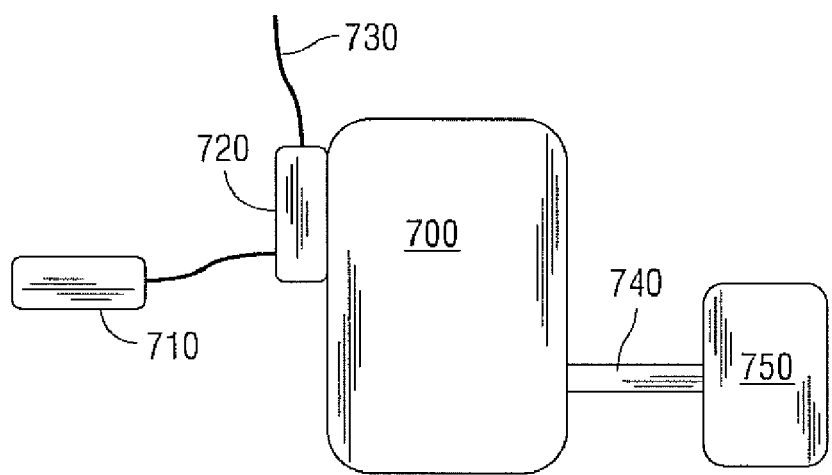
FIG. 7 is a view of an internal combustion engine system.

With reference to FIG. 7, an internal combustion engine 700 includes a source of hydrogen 710 in fluid communication with a mixing block 720. The mixing block sets the hydrogen/air calibration based on user input including a throttle 730 setting. The internal combustion engine further includes a crank output shaft or driver 740 that may be connected to any known and future varieties of machines 750 capable of being powered by an internal combustion engine including but not limited to a transmission to provide motive power to a vehicle, an alternator or generator to provide electrical power a battery system or electrically powered devices, or a pump for hydraulic or other fluid power devices. In another embodiment, a mixing block may include both an input for a source of hydrocarbon fuels such as gasoline or diesel and a source of hydrogen fuel.

Experimental mixing blocks have been applied to multiple internal combustion engines and have accumulated over 400 hours of operation with a fuel source of industrial grade, commercially available hydrogen. Several examples are informative Example 1-6 Horsepower (HP) Engine Configured with High Pressure Washer

TABLE 1

|  | Stock ICE | Mixing Block ICE | Mixing Block, Modified ICE |
|---|---|---|---|
| Class: | Air Cooled Overhead Cam, Chain Drive, ICE | Air Cooled Overhead Cam, Chain Drive, ICE | Air Cooled Overhead Cam, Chain Drive, ICE |
| Shaft: | Horizontal | Horizontal | Horizontal |
| Cylinders: | 1 | 1 | 1 |
| Displacement: | 169 cc | 169 cc | 169 cc |
| Cycles: | 4 | 4 | 4 |
| Fuel: | Unleaded Gasoline | Hydrogen | Hydrogen |
| Max HP/RPM: | 4.89/4000 (Gross HP) | 2.0/4000 (Gross HP) | 3.7/4000 (Gross HP) |
| Bore X Stroke: | 67 × 48 (mm) | 67 × 48 (mm) | 67 × 48 (mm) |
| Compression: | 9:1 | 9:1 | 10.2:1 |
| Timing: | Factory set | Factory | Advanced |
| Governor System: | Centrifugal Flyweight | Centrifugal Flyweight | Centrifugal Flyweight |
| Fuel System: | Carbureted Float | Mixing block | Mixing block |
| $CO_2$ Emissions: | 13 PPM | 0 PPM | Not measured** |
| O2 Emissions: | 2.59 PPM | 0 PPM | Not measured** |
| HC Emissions: | 174 PPM | 2 PPM* | Not measured** |
| NOX Emissions: | 706 PPM | 38 PPM | Not measured** |
| CO Emissions: | 2.94 PPM | 0 PPM | Not measured** |

*particulate detected believed to be lubrication oil breakdown
**not believed to materially differ from unmodified mixing block In the column labeled "Mixing Block ICE," changes are shown from the stock ICE. Aside from replacing the carburetor with a mixing block, another change from stock was to increase the gap on the spark plug called for by the manufacturer. In this case, we doubled the gap. Additionally, we used a regulator to regulate the pressure from the commercial hydrogen tank (approximately 2200 psi) down to working pressure (about 5 psi). As is seen, there was a slight reduction in observed horse-power in the mixing block modified ICE. In the third column, namely, "Modified Mixing Block ICE," other modifications were made to improve performance. Specifically, the compression ratio was increased to 10.2:1 through a piston and head change and the timing was advanced by 2 degrees. These changes were able to increase observed horsepower by 1.5 HP. We believe that increasing the compression ratio to 14:1 will further increase observed horsepower.

Example 2-7.5 HP Engine Configured with Rototiller

TABLE 2

|  | Stock ICE | Mixing Block, Modified ICE |
|---|---|---|
| Class: | Air Cooled Overhead Cam, Chain Drive, Gasoline Engine | Air Cooled Overhead Cam, Chain Drive, Gasoline Engine |
| Shaft: | Horizontal | Horizontal |
| Cylinders: | 1 | 1 |
| Displacement: | 211 cc | 211 cc |
| Cycles: | 4 | 4 |
| Fuel: | Unleaded Gasoline | Hydrogen |
| Max HP/RPM: | 5.1/4000 (Gross HP) | To be determined |
| Bore X Stroke: | 67 × 60 (mm) | 67 × 60 (mm) |
| Compression: | 8.5:1 | 10.2:1 |
| Timing: | Factory set | Advanced |
| Governor System: | Centrifugal Flyweight | Centrifugal Flyweight |
| Fuel System: | Throttle Body - Electronic Fuel Injection | Mixing block |
| $CO_2$ Emissions: | 13.2 PPM | 0 PPM |
| O2 Emissions: | 1.35 PPM | 0 PPM |

TABLE 2-continued

| | Stock ICE | Mixing Block, Modified ICE |
|---|---|---|
| HC Emissions: | 149 PPM | 1 PPM* |
| NOX Emissions: | 426 PPM | 26 PPM |
| CO Emissions: | 2.38 PPM | 0 PPM |

*particulate detected believed to be lubrication oil breakdown

Example 3-8 HP Engine Configured with Generator

TABLE 3

| | Stock ICE | Mixing Block ICE |
|---|---|---|
| Class: | Air Cooled Overhead Cam, Chain Drive, Gasoline Engine | Air Cooled Overhead Cam, Chain Drive, Gasoline Engine |
| Shaft: | Horizontal | Horizontal |
| Cylinders: | 1 | 1 |
| Displacement: | 305 cc | 305 cc |
| Cycles: | 4 | 4 |
| Fuel: | Unleaded Gasoline | Hydrogen |
| Max HP/RPM: | 5.1/4000 (Gross HP) | To be determined |
| Bore X Stroke: | 3.12 × 2.44 (in.) | 3.12 × 2.44 (in.) |
| Compression: | 8.5:1 | 8.5:1 |
| Governor System: | Centrifugal Flyweight | Centrifugal Flyweight |
| Fuel System: | Carbureted Float | Mixing block |

Example 4-13.5 HP Engine Configured with Garden Tractor

TABLE 4

| | Stock ICE | Mixing Block ICE |
|---|---|---|
| Class: | Air Cooled Gasoline Engine | Air Cooled Gasoline Engine |
| Shaft: | Vertical | Vertical |
| Cylinders: | 1 | 1 |
| Displacement: | 405 cc | 405 cc |
| Cycles: | 4 | 4 |
| Fuel: | Unleaded Gasoline | Hydrogen |
| Max HP/RPM: | 12/3600 | To be determined |
| Bore X Stroke: | 3.43 × 2.66 (in.) | 3.43 × 2.66 (in.) |
| Compression: | 8.5:1 | 8.5:1 |
| Governor System: | Centrifugal Flyweight | Centrifugal Flyweight |
| Fuel System: | Carbureted Float | Mixing block |

Example 5-13 HP Engine Configured with EZ-Go 6 Passenger Shuttle

TABLE 5

| | Stock ICE | Mixing Block ICE |
|---|---|---|
| Class: | Air Cooled Gasoline Engine | Air Cooled Gasoline Engine |
| Shaft: | Horizontal | Horizontal |
| Cylinders: | 1 | 1 |
| Displacement: | 401 cc | 401 cc |
| Cycles: | 4 | 4 |
| Fuel: | Unleaded Gasoline | Hydrogen |
| Max HP/RPM: | 13/3600 | To be determined |
| Bore X Stroke: | 3.43 × 2.66 (in.) (87 × 67 mm) | 3.43 × 2.66 (in.) (87 × 67 mm) |
| Compression: | 8.4:1 | 8.4:1 |
| Governor System: | Centrifugal Flyweight | Centrifugal Flyweight |
| Fuel System: | Carbureted | Mixing block |

Figure 8:
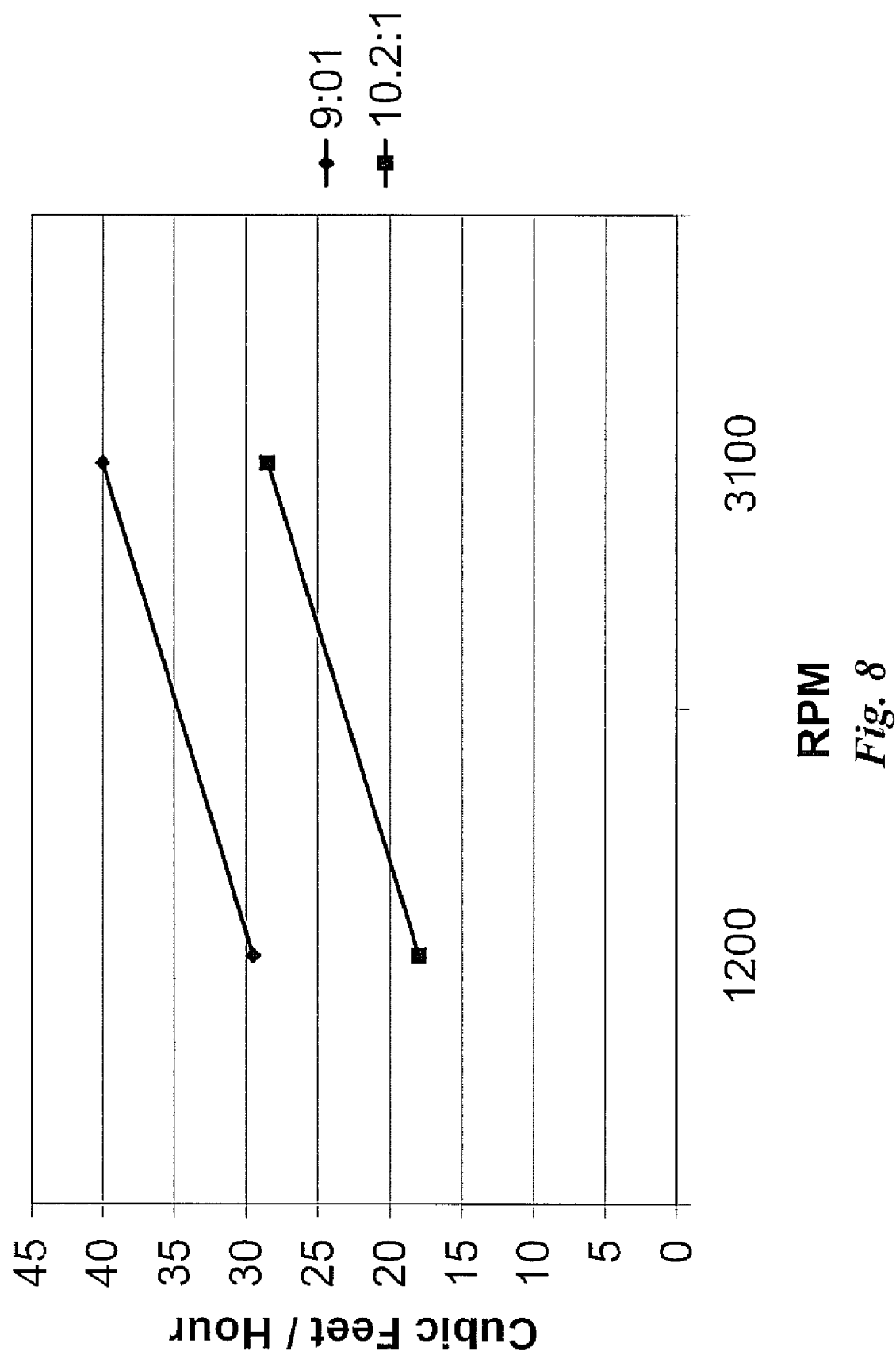
FIG. 8 is a chart of cubic feet per hour hydrogen use at exemplary RPM's on a sample internal combustion engine.

With reference to FIG. 8, hydrogen usage at two exemplary RPM settings, 1200 and 3100 are shown with corresponding fuel consumption measured in cubic feet hydrogen per hour. At 9:1 compression the internal combustion engine used 295 cubic feet of hydrogen/hour at an idle set at about 1200 RPM. At a sample working speed of 3100 RPM, the engine used about 40.0 cubic feet of hydrogen/hour. Significant fuel economy was achieved by increasing the compression of the internal combustion engine to 10.2:1. For example, at the selected idle speed 1200 RPM the engine used about 18.0 cubic feet of hydrogen/hour, and at the selected working speed 3100 RPM the engine used about 28.5 cubic feet of hydrogen/hour. We expect further significant fuel economy will be achieved at higher compression ratios.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. A mixing block adapted to supply a throttle-able fuel and air mixture to an internal combustion engine, the mixing block consisting essentially of:

TABLE 5-continued

| | Stock ICE | Mixing Block ICE |
|---|---|---|
| Governor System: | Centrifugal Flyweight | Centrifugal Flyweight |
| Fuel System: | Carbureted | Mixing block |

A bore through the mixing block between an air intake side and an engine intake side;

A slider chamber orthogonal to and intersecting the bore, where the slider chamber houses a movable slider biased to at least partially block the bore but throttleable to overcome the bias and reduce blockage of the bore;

A jet chamber parallel to and intersecting the slider chamber and extending away from the slider chamber a distance sufficient to accommodate a shaped needle, where the needle is connected to the slider on one side such that the needle moves within the jet chamber as the slider moves in the slider chamber, where needle movement meters fuel to the bore; and A fuel inlet intersecting the jet chamber at a location substantially opposed from the slider chamber; and A fuel shutoff selectively permitting and alternately interrupting a path of gas-phase fuel from a fuel source to the mixing block, where the fuel shutoff includes a switch electrically connected to a solenoid, where a first condition of the switch controls the solenoid to permit gas-phase fuel to the mixing block and where a second condition of the switch controls the solenoid to interrupt gas-phase fuel to the mixing block.

2. The mixing block as set forth in claim 1, where the fuel shutoff further includes:

A vacuum switch permitting electrical connection through the vacuum switch to the solenoid upon sensing at least the partial vacuum in the bore.

3. The mixing block as set forth in claim 1, where the solenoid is connected in electrical series with the switch and a battery.

4. The mixing block as set forth in claim 1, where the movable slider is biased with a spring.

5. The mixing block as set forth in claim 1, where the gas-phase fuel consists essentially of hydrogen.

6. The mixing block as set forth in claim 1, where the gas-phase fuel consists essentially of natural gas.

7. A mixing block consisting essentially of:

A bore through the mixing block between an air intake side and an engine intake side;

A slider chamber orthogonal to and intersecting the bore, where the slider chamber houses a movable slider to throttlably control air flow through the bore to the engine intake side;

A jet chamber parallel to and intersecting the slider chamber and extending away from the slider chamber a distance sufficient to accommodate a shaped needle, where the needle is connected to the slider on one side such that the needle moves within the jet chamber as the slider moves in the slider chamber, where needle movement controls fuel to the bore; and A fuel inlet intersecting the jet chamber at a location substantially opposed from the slider chamber; and A fuel shutoff selectively permitting and alternately interrupting a path of gas-phase fuel from a fuel source to the mixing block, where the fuel shutoff includes a switch electrically connected to a solenoid, where a first condition of the switch controls the solenoid to permit gas-phase fuel to the mixing block and where a second condition of the switch controls the solenoid to interrupt gas-phase fuel to the mixing block.

8. The mixing block as set forth in claim 7, where the solenoid is connected in electrical series with the switch and a battery.

9. The mixing block as set forth in claim 7, where the movable slider is biased with a spring.

10. The mixing block as set forth in claim 7, where the gas-phase fuel includes hydrogen.

11. The mixing block as set forth in claim 7, where the gas-phase fuel includes natural gas.

* * * * *